(12) United States Patent
Chaponniere et al.

(10) Patent No.: US 6,449,490 B1
(45) Date of Patent: *Sep. 10, 2002

(54) TRANSMITTER DIRECTED CODE DIVISION MULTIPLE ACCESS SYSTEM USING PATH DIVERSITY TO EQUITABLY MAXIMIZE THROUGHPUT

(75) Inventors: Etienne F. Chaponniere, Paris (FR); Peter J. Black; Jack M. Holtzman, both of San Diego, CA (US); David Ngar Ching Tse, Berkeley, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,700

(22) Filed: Jun. 30, 1999

Related U.S. Application Data

(63) Continuation-in-part of application No. 09/317,298, filed on May 24, 1999.

(51) Int. Cl.[7] .................................................. H04Q 7/20
(52) U.S. Cl. ....................... 455/507; 455/434; 455/445; 455/450; 455/452; 455/464
(58) Field of Search ................................. 370/238, 252, 370/329, 335, 342, 441, 468, 330, 341, 344; 455/450, 452, 434, 445, 464, 507

(56) References Cited

U.S. PATENT DOCUMENTS

| | | |
|---|---|---|
| 3,351,859 A | 11/1967 | Groth, Jr. et al. |
| 4,112,257 A | 9/1978 | Frost |
| 4,222,115 A | 9/1980 | Cooper et al. |
| 4,291,410 A | 9/1981 | Caples et al. |
| 4,630,283 A | 12/1986 | Schiff |
| 4,669,091 A | 5/1987 | Nossen |
| 4,672,658 A | 6/1987 | Kahrad et al. |
| 4,694,467 A | 9/1987 | Mui |
| 4,710,944 A | 12/1987 | Nossen |
| 4,736,460 A | 4/1988 | Rilling |
| 4,752,969 A | 6/1988 | Rilling |
| 4,765,753 A | 8/1988 | Schmidt |
| 4,797,950 A | 1/1989 | Rilling |
| 5,226,045 A | 7/1993 | Chuang |
| 5,335,357 A * | 8/1994 | Fennell et al. ............... 455/503 |
| 5,345,599 A * | 9/1994 | Paulraj et al. ............... 455/500 |
| 5,361,399 A * | 11/1994 | Linquist et al. ............. 455/412 |
| 5,365,569 A * | 11/1994 | Witsaman et al. ............. 379/57 |
| 5,781,541 A * | 7/1998 | Schneider .................... 370/335 |
| 5,910,950 A * | 6/1999 | ten Brink .................... 370/342 |
| 6,157,619 A * | 12/2000 | Ozluturk et al. ............. 370/252 |
| 6,160,801 A * | 12/2000 | Uchida et al. ............... 370/337 |

FOREIGN PATENT DOCUMENTS

| | | |
|---|---|---|
| WO | 9912304 | 3/1999 |

* cited by examiner

*Primary Examiner*—Daniel Hunter
*Assistant Examiner*—Yemane Woldetatios
(74) *Attorney, Agent, or Firm*—Philip R. Wadsworth; Kent D. Baker; Sean English

(57) ABSTRACT

A transmitter directed, distributed receiver using path diversity provided by the distribution of the receiver. Advantage is taken of the uncorrelated variations over time in the condition of channels between a common transmitter and several users. The greater the variation in the channel condition of a particular channel over time, the greater the increase in total system throughput provided. An access metric represents the instantaneous channel condition of the communication system between each user and the transmitter with respect to the average channel condition of each channel. Alternatively, the access metric represent the instantaneous channel condition with respect to the average data throughput over that channel. The common transmitting station uses the access metric to directly compare the desirability of granting each channel access with the desirability of granting each other channel access. The user that has the greatest access metric is provided access to the channel.

46 Claims, 5 Drawing Sheets

TRANSMITTER DIRECTED CODE DIVISION MULTIPLE ACCESS SYSTEM USING PATH DIVERSITY TO EQUITABLY MAXIMIZE THROUGHPUT

RELATED APPLICATIONS

The present application is a continuation-in-part of U.S. patent application Ser. No. 09/317,298, filed May 24, 1999 and assigned to the assignee of the present application.

BACKGROUND OF THE INVENTION

1. Field of the Invention

The present invention relates to communication systems. More particularly, the present invention relates to a method and apparatus for determining to which user to provide access from among several users attempting to access a code division multiple access system.

2. Description of the Related Art

In accordance with several types of communication systems currently being used, access to the system is provided to one user at a time. Therefore, when a first user is granted access to the system, each other user must wait until the first user has released the system and access is granted to that user before he can use the system to communicate. Furthermore, in some such systems a scheduler is responsible for determining to which of the users access is to be granted. Each user applies to the scheduler for access to the system. The scheduler then selects from among the users that have submitted their applications.

In other systems, such as code division multiple access systems, access is granted to several users at once. In one such system, access is granted to users based upon several criteria. The first, and most important, criteria is to what type of service each user has subscribed. For example, in one such system, a user can request constant bit rate (CBR) service, variable bit rate (VBR) service, or available bit rate (ABR) service. Users that pay for CBR service are guaranteed to receive service at an agreed upon data rate (i.e., bit rate). In contrast, if a user pays for VBR service, the user will be provided service at the rate necessary to transmit the particular information that is being sent. In such cases, the user's fees are typically calculated based upon the rates that were requested and granted to the user. If the user pays for ABR service, then the user will be granted access and a data rate that on an "as available" basis. Therefore, if there is sufficient capability in the system to provide access to an ABR user, then the ABR user will be granted access.

The capability of the system is typically dependent upon whether the amplifier in the transmitter is capable of transmitting the ABR user's information with sufficient power without overdriving the amplifier in light of the amount of power required by each of the CBR and VBR users' power requirements. The data rate at which the access will be granted will depend upon the amount of power that is available for transmitting the ABR user's data.

One example of an ABR user is an internet service provider (ISP). Since customers of an ISP are able to tolerate delays and lower data rates, ISPs typically will opt for the less expensive ABR service. Even so, there are frequently situations in which there is insufficient power to transmit data for all of the ABR users that are requesting ABR service at any particular point in time. Therefore, the transmitting station must determine to which ABR users service is to be provided.

Several techniques are known for determining how to select the particular user to whom access to a system should be granted in a shared access communication system in which access is granted to only one user at a time or to less than all of the users requesting service. Access to the system is provided by one or more channels (i.e., air interface links between a common transmitting station and the user) to the user. Accordingly, each user is associated with at least one channel. In a CDMA system, each channel is associated with a unique CDMA code. Typically, the condition (i.e., quality) of the channel directed to each user will vary over time. Furthermore, the condition of the channels will vary from user to user. In some systems, access is granted to the user that can most efficiently use the system (i.e., the user associated with the best channel and thus able to receive data at the highest rate), thus maximizing the throughput of the communication system (i.e., amount of data that can be communicated by the system within a predetermined amount of time). In other systems, access is granted such that each user will be provided with essentially equal access to the system when compared with the other users over a predetermined period of time. Equal access can refer to either the fact that each user gets an equal amount of time to communicate over the system, or that each user gets to transmit an equal amount of data over the system. Both the scheme in which the most efficient system user gets access and the scheme in which equal access is provided to each user are deficient. The scheme that focuses on maximizing throughput can lead to a situation in which some users receive little access to the system. In systems in which each user pays equally for access, this situation is unacceptable due to the resulting inequitable distribution of access. Likewise, in schemes in which each user is granted equal access regardless of the ability of that user to efficiently use the system, the throughput of the system suffers.

Accordingly, there is a need for a method and apparatus for determining to which user to grant access to a shared access communication system, such that the throughput of the system is maximized while ensuring that each user is granted equitable access to the communication system.

SUMMARY OF THE INVENTION

The disclosed method and apparatus is a transmitter directed, multiple receiver, communication system using path diversity. Path diversity is provided by the fact that at least some of the receivers are uniquely located with respect to others of the receives. Due to the differing paths, variations in the channel conditions of the channels will be uncorrelated. Therefore, at any particular time, some receivers will have a better instantaneous channel condition relative to the average condition of that channel.

The presently disclosed method and apparatus attempts to achieve two essentially competing goals in a system in which access is provided to less than all of the users at any one time. The first of these two goals is to equitably provide access to users of the communication system over "channels" (e.g., air interface links) between a common transmitting station and each user. The second of these two goals is to maximize the total amount of data communicated through all of the channels of the communication system (i.e., system throughput).

The disclosed method and apparatus attempts to balance the two competing goals stated above by taking advantage of uncorrelated variations in the condition of each channel over time. In the simple case of two channels competing for access to the system, the times at which the channel conditions for the first channel are relatively high are essentially arbitrary with respect to the times at which the channel conditions for the second channel are relatively high. The presently disclosed method and apparatus takes advantage of this fact by attempting to transmit to the user associated with the channel that has the highest instantaneous channel condition relative to the average channel conditions for that channel. That is, by transmitting over the channel that has the greatest ratio of current conditions to average conditions, each channel will be used when it is at its best. If each channel is only used when it is at its best, the overall throughput of the system will be increased.

The determination as to which channel to select is made as follows. The common transmitting station transmits information to the users in time slots. A time slot is a period of time having a predetermined duration during which the common transmitting station transmits to a limited number of users. It will be assumed for simplicity that the common transmitter can transmit on only one channel at a time. Accordingly, for each time slot, the common transmitting station must select one channel. The instantaneous condition of the channel between a user and the common transmitting station is monitored by the user. An instantaneous channel condition indicator is communicated by the user to the common transmitting station for each time slot. The instantaneous channel condition indicator is a value representative of the condition of the channel during one time slot. The common transmitting station filters the instantaneous channel condition indicators associated with each channel to generate a filter output value for each channel at each time slot. In one embodiment of the disclosed method and apparatus, the filter function is defined such that a filter output value associated with each user and each transmission time slot represents the average throughput (i.e., average amount of data transmitted to that user over a period of time). Alternatively, the filter function is defined such that the filter output value represents an average of the channel condition of the channel between the common transmitting station and the user associated with the channel.

In accordance with one embodiment of the presently disclosed method and apparatus, for each channel the value of the instantaneous channel condition indicator is compared to (e.g., divided by) the filter output value for that channel to generate an "access metric" for that channel. The access metric is a measure of the desirability of granting the user access relative to the desirability of granting each other user access. The common transmitting station uses the access metric to directly compare the desirability of granting access to any one channel with the desirability of granting access to each other channel. The user that has the greatest access metric is provided access to the channel.

In one embodiment of the disclosed method and apparatus, the filter output value is generated using a low-pass filter function to define a window in time over which the filter output value will be generated. A time constant of the filter reflects a "fairness time-scale" (i.e., the duration of the window in time). The fairness time-scale represents the duration of time over which it is desirable to have equitable access provided to each user. It should be understood that the fairness time-scale is dependent upon factors that include the type of data that is being transmitted to the users. For example, assume the transmission of internet data to users attempting to gain access to the internet. If each user receives an equitable amount of access to the system within a one second, each user is likely to consider the access granting scheme to be fair, even if one user gets greater access for a the entire beginning portion of the second. Accordingly, one second would be an appropriate fairness time-scale. In contrast, if the fairness time-scale were only one millisecond, then allowing one user access to the system for the first 100 milliseconds of the second would not be considered to be fair.

In one embodiment of the presently disclosed method and apparatus, the filter output value is updated only when the channel associated with that filter has been provided access. In the preferred embodiment of the presently disclosed method and apparatus, the filter output value is updated based on the rate at which that user received data. In this way, the filter output value reflects the average throughput to each user. This results in a built-in feedback mechanism that works to bias the selection of which user is to gain access. In accordance with this method and apparatus, when a user has been granted access, that user will be automatically penalized when competing for access in the future.

Alternatively, in the case in which the filter output value represents the average channel condition, a bias is created by artificially increasing the access metric to compensate for the increase in the throughput to that user with respect to the users that did not received access during that period. The amount of this compensation may be fixed or may be proportional to the amount of data that was received during the last access. This allows the control of the average throughput to users to be weighted to favor those users that have received less data.

Details of the disclosed method and apparatus are provided in the detailed description that follows.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EMBODIMENTS OF THE DISCLOSED METHOD AND APPARATUS

Functional Overview

Figure 1:
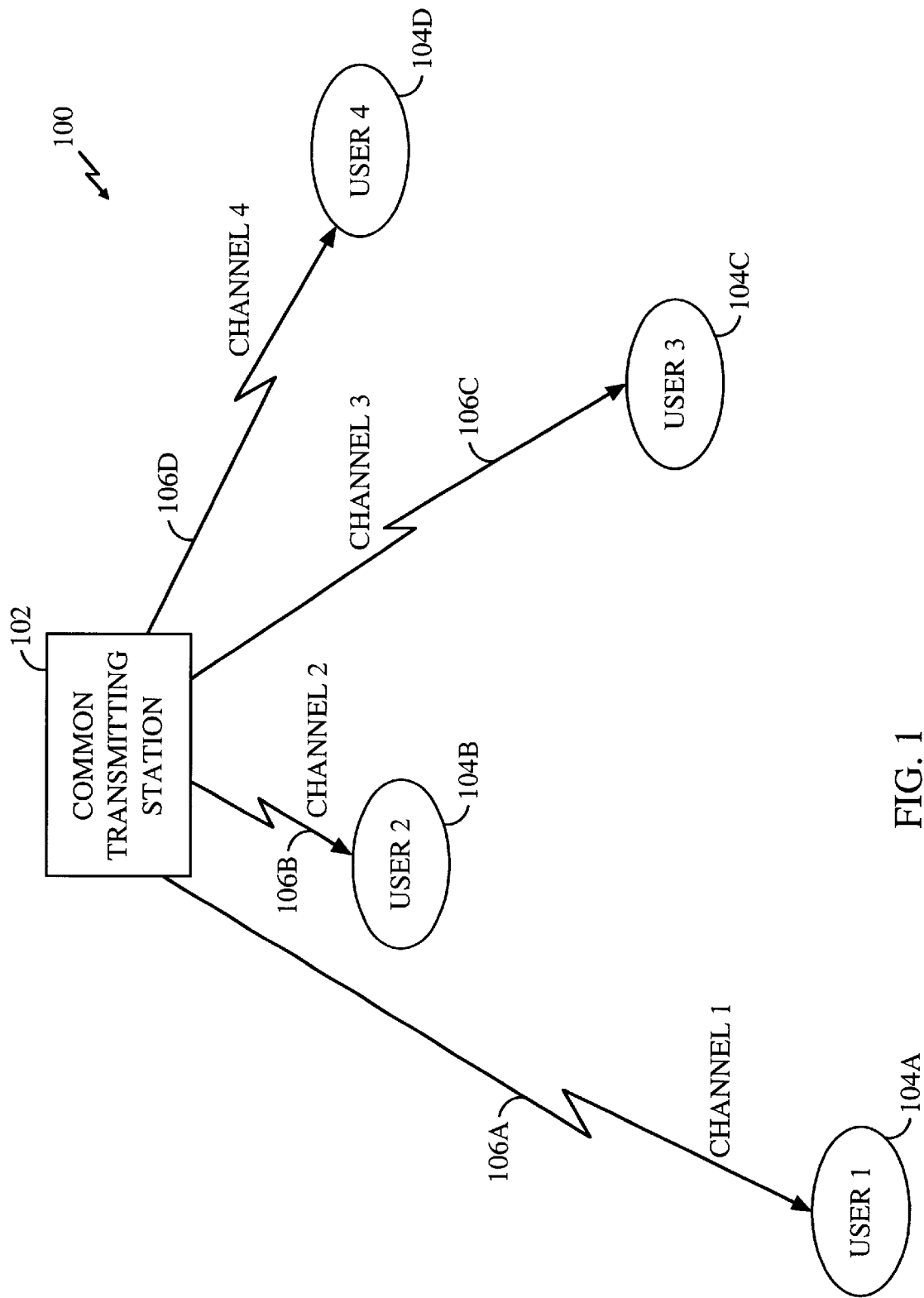
FIG. 1 is a simplified block diagram of a communication system in accordance with the presently disclosed method and apparatus.

FIG. 1 is a simplified block diagram of a communication system 100 in accordance with the presently disclosed method and apparatus. The system 100 includes a common transmitting station 102 and a plurality of users 104. In FIG. 1, four such users 104 are shown. However, it will be understood by those skilled in the art that any number of users 104 may be included in the system 100. Furthermore, in cases in which one or more of the users 104 are mobile, the number of users 104 in the system may vary over time. Each user 104 can be considered as a receiving element of a distributed receiver that includes all, or some, of the users 104. However, the users 104 of the presently disclosed method and apparatus need not combine, or provide to a common end user, the data that is received by each user 104.

Accordingly, the receivers 104 may also be considered to be completely independent.

Each user 104 is capable of communicating with the common transmitting station 102 over an associated channel 106. For example, as shown in FIG. 1, a first user 104a receives transmissions from the common transmitting station 102 over an associated channel 106a. However, it should be noted that each user 104 may receive communications from the common transmitting station 102 over more than one associated channel 106. Such additional channels may exist as channels that use different frequencies, antennas, etc. In addition, such additional channels may exist due to multiple propagation paths between the common transmitting station 102 and the user 104. However, in the preferred embodiment of the disclosed method and apparatus, multiple propagation paths for the same signal are combined and treated as a single channel 106.

In one embodiment of a system in which the disclosed method and apparatus may be used, the common transmitting station 102 transmits signals to users during time slots. Each time slot preferably has a predefined and equal duration. However, the duration of such time slots may vary to accommodate varying data rates or for other reasons. The common transmitting station 102 preferably only transmits to one user 104 during each time slot. However, in an alternative embodiment of the disclosed method and apparatus, the common transmitting station 102 transmits signals to more than one, but less than all, of the users 104 in each time slot. In either case, for each time slot, the common transmitting station 102 must determine to which user or users 104 signals are to be transmitted.

This document discloses a method and apparatus for determining to which user or users 104 the common transmitting station 102 shall transmit in a way that maximizes the amount of data to be transmitted to all users 104, while ensuring that each user 104 receives an equitable amount of data with respect to each other user 104 over a predetermined "fairness time-scale". An "equitable amount of data" means that essentially equal receive-capability ratios. The receive-capability ratio is equal to the amount of data transmitted over a channel relative to the data rate that the channel can support. However, the disclosed method and apparatus can alternatively be adjusted to favor greater data throughput at the expense of providing more access to users using channels that can support higher data rates over the fairness time-scale.

In accordance with the presently disclosed method and apparatus, each user 104 preferably monitors the condition of the channel from the user 104 to the common transmitting station 102 and transmits an instantaneous channel condition indicator to the common transmitting station 102. Each instantaneous channel condition indicator is a value representative of the condition of one channel during one time slot. In one particular embodiment of the presently disclosed method and apparatus, the instantaneous channel condition indicators are values representing a desired rate at which data is to be transmitted to the user 104 by the common transmitting station 102. In one such embodiment, the instantaneous channel condition indicators are data rate request (DRC) messages. Such DRCs typically indicate the maximum data rate at which data can be transmitted over the channel 106 with a predetermined bit error rate (BER).

The maximum data rate for a particular channel 106 is indicative of the carrier-to-interference ratio (C/I) for the channel 106. Alternatively, each user 104 monitors and communicates the C/I directly. In yet another alternative embodiment of the presently disclosed method and apparatus, the user 104 communicates instantaneous channel condition indicators that provide the common transmitting station 102 with an indication of the condition (i.e., quality) of the channel 106 without direct reference to either C/I or data rates. For example, the user 104 may provide the common transmitting station 102 with an indication of the amount of interference received by the user 104 and the amount of loss in the channel 106 between common transmitting station and the user 104.

It should be clear to those skilled in the art that there are several parameters, characteristic values, etc., that can be communicated by the user 104 to the common transmitting station 102 in order to characterize the channel conditions. The particular parameter or characteristic that is transmitted is not significant to the functioning of the presently disclosed method and apparatus. However, in the preferred embodiment of the presently disclosed method and apparatus, the channel condition indicator is directly proportional to the data rate at which the common transmitting station 102 will transmit data to the user 104 if that user is granted access to the channel 106 in the next time slot.

Figure 2A:
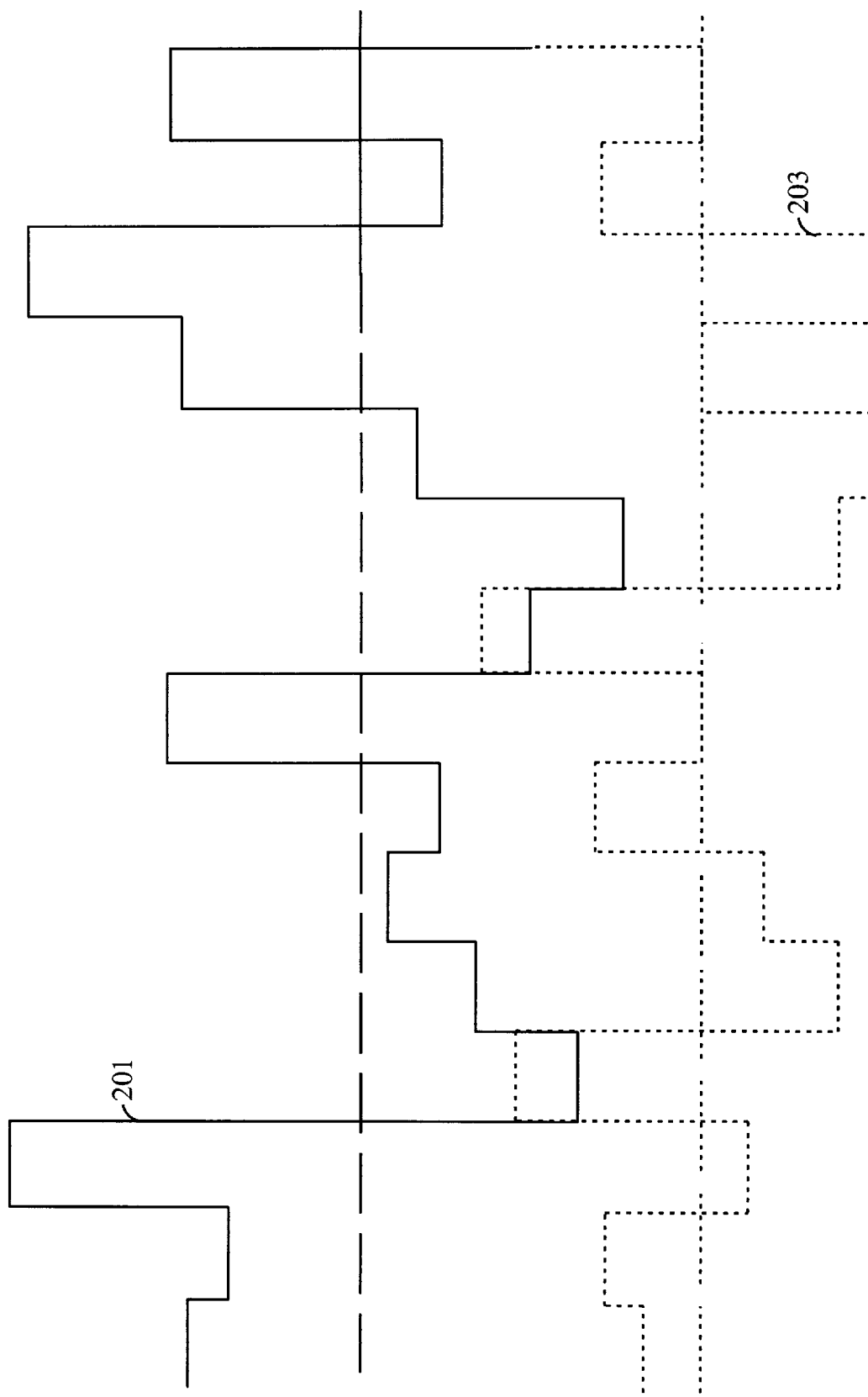
FIG. 2*a* is a graphical representation of the channel condition of a first channel and a second channel over time.

FIG. 2a is a graphical representation of the channel condition of a first channel 106a and a second channel 106b over time. The channel conditions of the first channel 106a are represented by a line 201. The channel conditions of the second channel 106b are represented by a dotted line 203. From FIG. 2, it can be seen that the channel conditions for both channels vary significantly over time. Furthermore, at nearly every point in time, the second channel 106b has superior channel conditions as compared to the first channel 106a. This can be understood by referring to FIG. 1 which shows that user 104a, which receives the channel 106a, is farther from the common transmitting station 102 than is user 104b, which receives the channel 106b. The greater distance between the common transmitting station 102 and the user 104a results in greater attenuation of the signal being received from the first user 104a. This results in an average channel condition for the first channel 106a (represented by a line 205) that is greater then the average channel condition (represented by a dotted line 207).

It can be seen from FIG. 2a that the variations in the channel conditions of the two channels 106 are uncorrelated. Therefore, the times at which the channel conditions for the first channel are relatively high are essentially arbitrary with respect to the times at which the channel conditions for the second channel are relatively high. The presently disclosed method and apparatus takes advantage of this fact by attempting to transmit to a user 104 associated with a channel that has a relatively high instantaneous channel condition relative to the average channel conditions for that channel 106. That is, by transmitting over the channel that has the greatest ratio of current conditions to average conditions, each channel will be used when it is at its best. If each channel is only used when it is at its best, the overall throughput of the system will be increased. Therefore, in accordance with one embodiment of the presently disclosed method and apparatus, the particular channel over which data is to be transmitted in any one time slot is selected as a function of the instantaneous channel conditions relative to the average channel conditions. However, in the preferred embodiment of the presently disclosed method and apparatus, selection of the channel over which data is to be transmitted in each slot is based on a function of the instantaneous channel condition relative to the average data throughput of a channel. The particular functions are defined below.

It will be understood by those skilled in the art that granting access to a user associated with a channel 106 having the highest channel conditions relative to the average channel conditions for that channel would greatly increase the data throughput for channels that have greater variations in channel condition. However, when contrasted with the throughput provided by an access scheme that granted equal access time to each user, such a scheme would not increase the data throughput for channels that have relatively low variations in channel conditions.

Figure 2B:
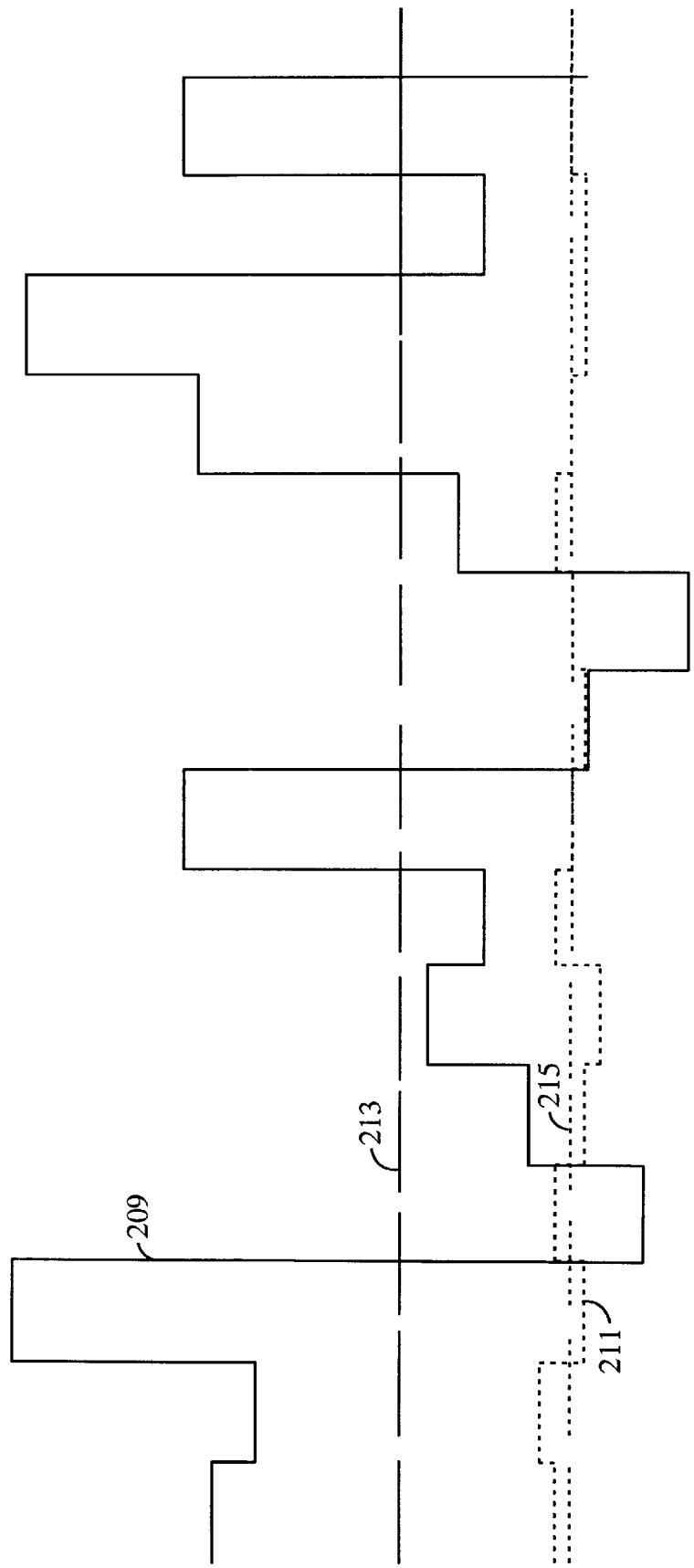
FIG. 2*b* is a graphical representation of the channel condition of a first channel and a second channel over time.

This can be understood by analyzing the case in which a first user 104a is associated with a channel 106a that has relatively great variations in the channel conditions, while a second user 104b is associated with a channel 106b that has relatively small variations in the channel conditions. FIG. 2b is a graphical representation of the channel conditions of such a first channel 106a, and second channel 106b. A line 209 represents the channel conditions of the first channel 106a and a dotted line 211 represents the channel conditions of the second channel 106b. A line 213 represents the average channel condition of the first channel 106a and a dotted line 215 represents the average channel condition of the second channel 106b.

Assuming that over the selected fairness time-scale, the channel condition of the first channel 106a is greater than average for half the time and less than the average for half the time, the same amount of access time will be granted to both the first and second channels 106a, 106b. However, the first channel 106a will have greater throughput than it would have had if equal access time were granted to each channel arbitrarily (e.g., in round robin fashion). However, the second channel 106b would have nearly the same data throughput, since the variations in the channel condition of the first channel 106a would dominate the selection process at the common transmitting station 102. That is, during the times when the first channel 106a has a relatively high quality, the second channel 106b will have an average quality. Accordingly, the first channel will be selected. During those times when the first channel 106a has a relatively low quality, the second channel 106b will have an average quality, and so be selected.

In order to compensate for this characteristic, a preferred embodiment of the presently disclosed method and apparatus selects the channel over which data is to be transmitted in a way that allows some of the increase in throughput to be distributed to users 104 associated with channels that have relatively small variations in channel condition. The way this is accomplished is disclosed in detail below.

Details of Functionality

Figure 3:
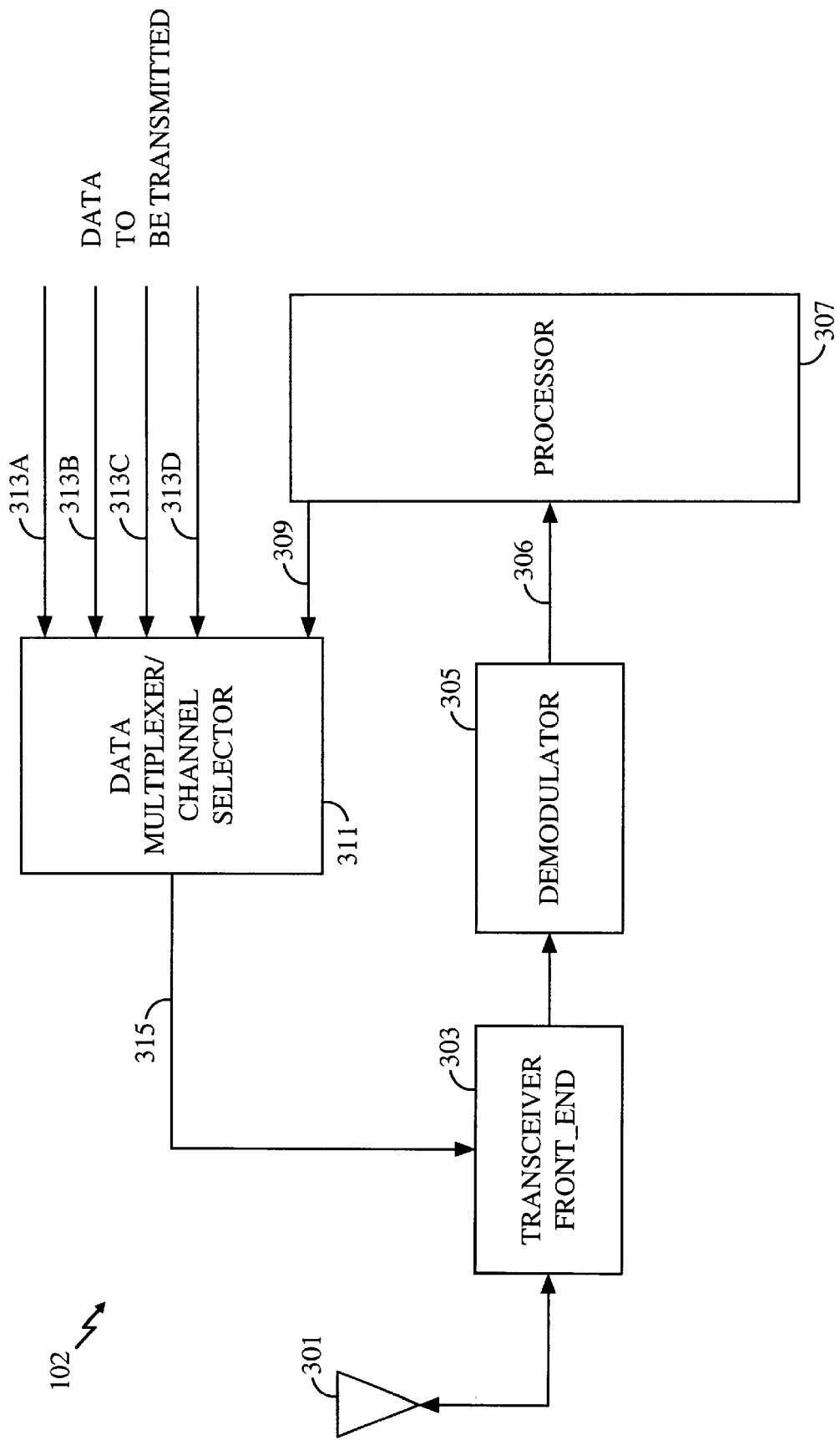
FIG. 3 is a simplified block diagram of a common transmitting station in accordance with the presently disclosed method and apparatus.

FIG. 3 is a simplified block diagram of a common transmitting station 102 in accordance with the presently disclosed method and apparatus. The common transmitting station 102 receives signals that include instantaneous channel condition indicators over an antenna 301. The antenna 301 is coupled to a transceiver front-end 303. The transceiver front-end includes well known conventional radio frequency (RF) components that allow the signal to be received and converted to a base band signal, such as a diplexer, down converters, filters, etc. The base band signal is then coupled to a demodulator 305. The demodulator 305 demodulates the base band signal to allow the instantaneous channel condition indicator information to be accessed. The instantaneous channel condition indicator information is then coupled to a processor 307. The processor 307 may be any programmable device, state machine, discrete logic, or combination of these (such as might be included within an application specific integrated circuit (ASIC) or programmable gate array) that is capable of performing the functions associated with processor 307.

Figure 4:
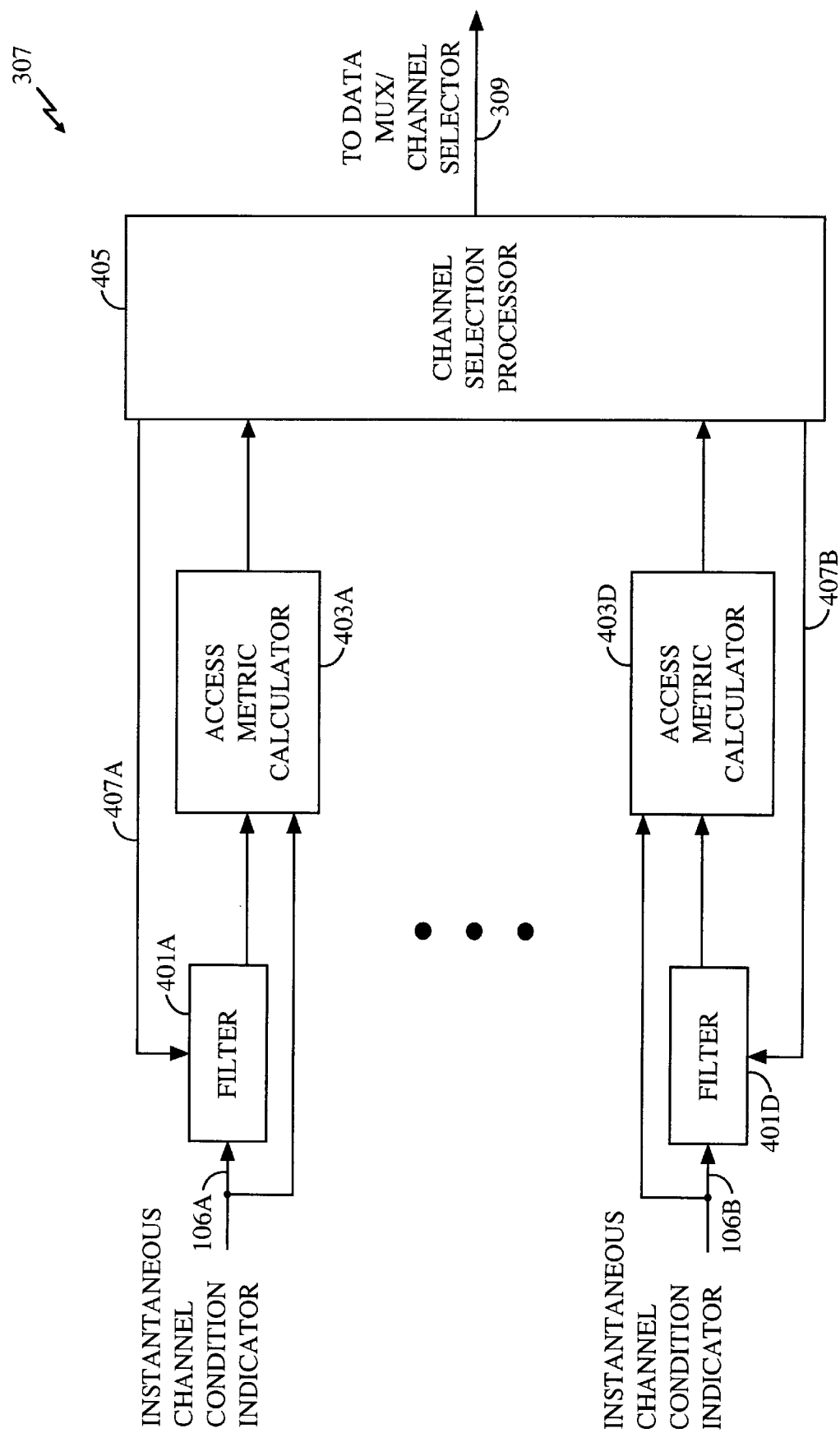
FIG. 4 is a functional block diagram of the functions performed by the processor.

FIG. 4 is a functional block diagram of the functions performed by the processor 307. As shown in FIG. 4, the processor 307 includes filter modules 401, access metric calculator modules 403, and a channel selection processor 405. It will be clear to those skilled in the art that each of the functions performed by processor 307 and depicted in FIG. 4 may be integrated into a single software or hardware module, or alternatively may be integrated into modules in any grouping desired. Accordingly, any group of one or more of the functions performed by the processor 307 may be performed by a single module. Nonetheless, for the sake of clarity, one filter module 401a and one metric calculator module 403a are shown to be associated with the instantaneous channel condition indicators received from one channel 106a, such that there is a one-to-one correspondence between channels 106 and filter modules 401 and likewise between filter modules 401 and access metric calculator modules 403. The processing of only one channel 106a is described in detail to simplify this disclosure.

The processor 307 receives an instantaneous channel condition indicator indicative of the instantaneous condition of the channel 106a within the filter module 401a associated with that channel 106a for each time slot. The filter module 401a calculates a filter output value based upon the instantaneous channel condition indicators received over the channel 106a. In accordance with one embodiment of the presently disclosed method and apparatus, the filter performs a low pass filter function.

The low pass function can be performed using one of several filter functions. In accordance with one such filter function, the filter output value F(t) is calculated as provided in the following expression:

$$F_k(t+1) = (1 - 1/t_c) * F_k(t) + 1/t_c * (ChC_k) \qquad \text{Eq. 1}$$

where $F_k(t)$ is the current filter output value at time t for the $k^{th}$ channel, $t_c$ is a time constant of a low pass filter function provided by this expression, and $ChC_k$ is the instantaneous channel condition indicator for the $k^{th}$ channel. The time constant represents a "fairness time_scale". The fairness time-scale represents the duration of time over which it is desirable to have essentially equal amounts of data transmitted to each user. It should be understood that the fairness time-scale is dependent upon factors that include the type of data that is being transmitted to the users. For example, assume the transmission of internet data to users attempting to gain access to the internet. If each user receives essentially equal amounts of data over a duration of approximately one second, each user is likely to consider the access granting scheme to be fair, even if one user gets greater access for the entire beginning portion of a second. Accordingly, one second would be an appropriate fairness time-scale.

Alternatively, the low pass filter function used to generate the filter output value sums the instantaneous channel condition indicators received for a channel and divides the sum by the total number of such instantaneous channel condition indicators that were summed. This is shown in the following equation:

$$F(t+1) = \frac{1}{t_c} \sum_{j=(t+1)-tc}^{t} ChC_k(j) \qquad \text{Eq. 2}$$

However, in the preferred embodiment of the presently disclosed method and apparatus, the filter output value is the average data throughput. In this case, the filter output value is calculated as the average of the instantaneous channel conditions representing the channel condition during the time when the channel has been selected. Accordingly, the filter output value is calculated differently depending upon whether the channel 106a was selected in the last slot or not. The filter module 401a is preferably coupled to the channel selection processor 405. The channel selection processor 405 indicates whether the channel 106a was selected in the last slot. If so, then the filter output value is calculated by the following expression:

$$F_k(t+1)=(1-1/t_c)*F_k(t)+1/t_c*(ChC_k)$$    Eq. 3

To have the filter output value represent the average throughput, the channel condition ChC must be proportional to the data rate. It can be seen from Eq. 3 that if the channel 106a was selected, the filter output value will be modified to become closer in value to the value representing the instantaneous channel condition at the time the value of the most recent instantaneous channel condition indicator was determined. Alternatively, if the channel 106a was not selected in the last slot, the filter output value is calculated by the following expression:

$$F_k(t+1)=(1-1/t_c)*F_k(t)$$    Eq. 4

If the instantaneous channel condition is proportional to the data rate to be used for the transmission to the user 104 over the selected channel 106, then the resulting filter output value will be the average data throughput filtered by a low pass filter having a time constant $t_c$.

It can be seen from Eq. 4 that whenever the channel 106a is not selected the filter output value decays at a rate determined by the time constant $t_c$. The updated value does not take into account the instantaneous condition of the channel. The filter output value for the channel 106a will continue to decay, regardless of the condition of the channel, until the channel 106a is selected again. At that time, the filter output value will be updated using the instantaneous channel condition indicator (i.e., the instantaneous channel condition indicator value most recently received by the common transmitting station 102). In the case in which the instantaneous channel condition indicators are related to the rate at which data is to be transmitted over the channel 106a, the filter output value is a representation of the total throughput of the channel 106a. That is, Eq. 4 can be through of as a low pass filter function with a time constant of $t_c$ applied to the instantaneous rate at which data is being transmitted on the channel. The result of the filtering is an average rate at which data is being transmitted over the channel for a period of time equal to the time constant $t_c$.

In an alternative filter designed to determine the average data throughput, for each slot in which the channel associated with the filter is selected, the low pass filter function sums the instantaneous channel condition indicators received for a channel and divides the sum by the total number of such instantaneous channel condition indicators that were summed. When the channel associated with the filter is not selected, the filter output value decays in accordance with Eq. 4.

It should be noted that in one embodiment of the presently disclosed method and apparatus, the initial value for the filter output value is equal to $R_{min}/N$, where $R_{min}$ is the minimum value allowed for the instantaneous channel condition indicator, and N is the total number of users 104. However, any reasonable initial value may be predetermined for the filter output value.

In accordance with another embodiment of the presently disclosed method and apparatus, the filter output value is biased upward by a constant each time the channel associated with that filter output value is selected. One such method of biasing the filter output value is to add a positive constant value to the filter output value, or to multiply the filter output value by a constant greater than one, in addition to time constant $t_c$ or any other adjustment to the value, whenever the channel associated with that filter output value is selected. Such a direct bias to the filter output value will increase the filter output value, and thus make it less likely that the channel associated with that filter output value will be selected in the next slot.

Once calculated, the filter output value is coupled to the access metric calculator 403a together with the most recently received instantaneous channel condition indicator. The most recently received instantaneous channel condition indicator represents the instantaneous channel condition in the form of the C/I ratio of the channel, the instantaneous data rate, or any other such parameter that indicates the current quality of the channel.

The access metric is calculated as a function of the instantaneous channel condition and the average channel condition. Accordingly, in one embodiment of the presently disclosed method and apparatus, the access metric is calculated as a function of: (1) the C/I ratio of the channel and the filter output value; or (2) the instantaneous data rate and the filter output value. In other alternative embodiments of the presently disclosed method and apparatus, the access metric can be calculated as a function of any other measure of the instantaneous channel condition relative to the filter output value.

The filter output value is a function of either: (1) the average data rate, or (2) the average channel condition. Therefore, the access metric is, for example, a function of: (1) the average data rate and the instantaneous channel condition, (2) the average channel condition and the instantaneous channel condition, (3) the average data rate and the instantaneous data rate, or (4) the average channel condition and the instantaneous data rate. In accordance with one embodiment, the access metric calculator 403a divides the most recently received instantaneous channel condition indicator by the filter output value to calculate an access metric, AM.

$$AM=ChC_k/F_k(t)$$    Eq. 5

It can be seen that the value of the access metric is directly proportional to the instantaneous channel condition. The higher the instantaneous channel condition, the greater the access metric for that particular channel. The access metric is calculated for each channel based upon the filter output value calculated for each channel. The access metrics of all of the channels 106 are then directly compared by the channel selection processor 405 to determine which channel 106 is to be selected for transmission in the next slot. The channel associated with the greatest access metric value is selected.

The channel selection processor 405 is coupled to each value calculator 401 via signal lines 407. Signal lines 407 couple information from the channel selection processor 405 to each filter module 401. The information indicates which channel 106 was selected for transmission in the next slot. The information may be in the form of a value indicating the particular channel 106 that was selected. Alternatively, the information may be a digital value indicating whether or not the receiving filter module 401 is associated with the selected channel. It should be understood that in the case in which the functions of the filter module 401, the access metric calculator, and the channel selection processor are all performed in one module, there may be no need for "signals" to be generated to indicate the results of each function. Alternatively, the results of one or more of the functions may be stored in a location accessible to one or more of the other functions.

Referring back to FIG. 3, the processor 307 outputs information indicating which channel 106 has been selected on a signal line 309 to a data multiplexer/channel selector 311. Several data lines 313a, 313b, 313c, 313d provide data to the data multiplexer/channel selector 311. Each of the data lines provides data that is to be transmitted to one of the users 104. In response to the signal provided on the signal line 309, the data multiplexer/channel selector 311 selects one of several data streams to be coupled to the transceiver front end 303. The selected data stream is coupled to the transceiver front end over a signal line 315. In accordance with the preferred embodiment of the presently disclosed method and apparatus, the transceiver front end 303 transmits the information received on signal line 315 to the user 104 associated with the selected channel 106 at a rate that is proportional to the most recent instantaneous channel condition indicator received from selected user 104.

Application to Concurrent Transmissions

In an alternative embodiment of the presently described method and apparatus, the common transmitting station 102 transmits signals to more than one user in each time slot. The common transmitting station 102 uses available power to first transmit signals to all of the constant bit rate (CBR) users and all the variable bit rate (VBR) users for which the common transmitting station 102 has data. Alternatively, if additional power is available after transmission to CBR users, then the common transmitter transmits to all of the variable bit rate (VBR) users for which the transmitting station 102 has data. If, after transmitting to all CBR and VBR users, there remains available power for additional signals to be transmitted, the common transmitting station 102 transmits to available bit rate (ABR) users. If the total power required by all of the ABR users exceeds the available power, then the following scheme is used determine to which ABR users the common transmitter will transmit. It should be understood that techniques can be used that allow a receiver to receive signals with less power than is necessary to decode the information transmitted in the signals without retransmission. In accordance with these techniques, power is accumulated over several repetitive transmissions (e.g., using R-rake receivers). Accordingly, the amount of power that is "required" will depend upon the number of times the common transmitting station will retransmit information.

In accordance with one embodiment of the presently disclosed method and apparatus, the common transmitter 102 determines an access metric based on the condition of the channel to each user and the "throughput". Throughput is defined as the amount of information that has been transmitted over a period of time. Accordingly, throughput can be associated with one or more users.

The throughput associated with a particular user is the amount of information that has been transmitted to that user. The throughput of the system is the total amount of information that has been transmitted to all users.

Throughput is preferably determined for each user by applying a filter function as follows:

$$T_k(t+1) = (1-(1/t_f))T_k(t) + (1/t_f)R_k(t) \quad \text{Eq. 6}$$

where $T_k(t)$ is the throughput at time t for the $k^{th}$ user, $t_f$ is a filter time constant, and $R_k(t)$ is the rate at which data was last transmitted to the $k^{th}$ user.

In accordance with one embodiment of the disclosed method and apparatus, if the common transmitter 102 has not transmitted to the $k^{th}$ user in the last time slot, then $R_k(t)$ is equal to zero. Accordingly, if the common transmitter has not transmitted to the $k^{th}$ user, then Eq. 6 reduces to the following equation for the $k^{th}$ user:

$$T_k(t+1) = (1-(1/t_f))T_k(t) \quad \text{Eq. 7}$$

where $T_k(t)$ is the throughput at time t for the $k^{th}$ user and $t_f$ is a filter time constant.

Accordingly, a filter applies either Eq. 6 or Eq. 7 and outputs a filter output value associated with each user, each such value representing the throughput of a channel to a user. An instantaneous channel condition is determined for each channel between the common transmitting station 102 and each user. In one embodiment of the presently disclosed method and apparatus, the instantaneous channel condition for the channel to the $k^{th}$ user is the carrier-to-interference (C/I) ratio for the channel to the $k^{th}$ user. It will be understood by those skilled in the art that any one of several well known methods can be used to determine the value of C/I.

In one embodiment of the presently disclosed method and apparatus, the access metric is a function of C/I and throughput. In one such embodiment, the instantaneous channel condition of the channel to the $k^{th}$ user is divided by the throughput (i.e., the filter output value for the $k^{th}$ user) of a channel to the $k^{th}$ user to generate an access metric. In another embodiment of the presently disclosed method and apparatus, the access metric is a function of the ratio of the instantaneous channel condition to the channel condition taken over time.

In the case in which the access metric is a function of the ratio of the C/I to the throughput, the access metric is used to determine to which ABR user, or users, information is to be transmitted in order to optimize the total system throughput while maintaining some level of "fairness" (i.e., essentially equitable system access) to all of the ABR users.

In one embodiment of the presently disclosed method and apparatus, a user may indicate to the common transmitting station 102 that a frame of data was not received or was received with more than a threshold number of errors. In this case, the throughput value associated with that user is preferably corrected to account for the fact that the data that was sent was not properly received. In accordance with one embodiment of the presently disclosed method and apparatus, the correction is made as follows:

$$T_k(\text{new}) = T_k(\text{old}) - (1/t_f)R_k(t) \quad \text{Eq. 8}$$

where $T_k(\text{new})$ is the corrected throughput value, $T_k(\text{old})$ is the throughput value prior to correction, $R_k(t)$ is the rate at which data was transmitted to the $k^{th}$ user during the last time slot t, and $t_f$ is the filter time constant that was used to update the throughput value $T_k(\text{old})$ to account of the rate at which information was transmitted at time t.

Accordingly, the resulting throughput $T_k(\text{new})$ will have the value that would have been calculated if no transmission were attempted during time t. This is appropriate, since the user did not receive the data that was transmitted during time t. In an alternative method and apparatus, the value of $T_k(t+1)$ can be returned to the value $T_k(t)$.

It should be noted that each user could receive data from the common transmitting station 102 at any data rate that is appropriate. Therefore, the common transmitting station 102 must determine the rate at which data is to be transmitted to each selected ABR user. In accordance with one embodiment of the disclosed method and apparatus, the amount of power that is available is used to determine the rate at which data will be transmitted to each selected ABR user. The ABR user with the greatest access metric is selected first. Transmissions are preferably made to that user at the highest rate possible. If there is any additional power available, then the ABR user with the next highest access metric is selected. The common transmitter preferably transmits to this user with the highest rate possible. This process continues until as much of the available power has been allocated as is possible. Alternatively, the available power can be allocated to each user based upon the relative value of the access metric associated with each ABR user. In yet another alternative, both the data rate and the amount of power to be used in transmitting to each user can be determined based on both the number of ABR users to which the common transmitting station 102 desires to transmit and the amount of available power.

For example, for N selected users wherein the $i^{th}$ user has an access metrics $A_i$, each user can be given the following fraction of total available power:

$$\frac{A_i}{\sum_{k=1}^{N} A_k} \qquad \text{Eq. 9}$$

A common transmitting station 102 can transmit to the five ABR users having the five greatest access metric values with power being divided among the users in proportion to the access metric associated with each user. It should be understood by those skilled in the art that there is a large variety of ways by which selection of the number of ABR users and the rates at which information is to be transmitted to them can be made. A significant feature of the disclosed method and apparatus is that an access metric is used to assist in selecting to which, from among a plurality of ABR users, transmissions are to be made.

In some cases, a common transmitter 102 may not have data ready for transmission to the ABR user with the best access metric. In this case, the throughput value associated with that user can be adjusted in one of at least three ways. First, the throughput value can be adjusted as though data were to be sent to that user at the rate that would have been selected if information were available for transmission. Second, the throughput value can be left unadjusted for that time slot. Third, the throughput value can be adjusted in the same manner as if the user were not selected for transmission.

A number of embodiments have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A method for determining to which users, from among a plurality of users, access to a communication system is to be provided, such access being provided at any one time to a group of users that includes less than all of the plurality of users, such access being provided to the plurality of users over a plurality of channels, each of the plurality of channels being associated with one of the users and providing communication between the associated user and a common transmitting station, the method comprising the steps of:

a) determining for each channel, a value representing the amount of data transmitted on the channel over a predetermined amount of time;

b) receiving a value representing the highest data rate at which each channel can currently receive data;

c) for each channel, determining a ratio of the received value representing the highest data rate, with respect to the value representing the amount of data transmitted; and d) transmitting over the channel associated with the highest ratio.

2. A method for determining to which users, from among a plurality of users, access to a communication system is to be provided, such access being provided at any one time to a group of users that includes less than all of the plurality of users, such access being provided to the plurality of users over a plurality of channels, each of the plurality of channels being associated with one of the users and providing communication between the associated user and a common transmitting station, the method comprising the steps of:

a) receiving an indication of a channel condition of a channel associated with each user;

b) calculating the average channel condition of the channels for which channel conditions are received;

c) for each user, determining a ratio of the most recently received indication of the channel condition with respect to the average channel condition; and d) transmitting over the channel associated with the highest ratio.

3. A method for determining to which users, from among a plurality of users, access to a communication system is to be provided, such access being provided at any one time to a group of users that includes less than all of the plurality of users, such access being provided to the plurality of users over a plurality of channels, each of the plurality of channels being associated with one of the users and providing communication between the associated user and a common transmitting station, the method comprising the steps of:

a) receiving an indication of an instantaneous channel condition of at least one of the several channels;

b) computing a filter output value for each channel for which the indication of the instantaneous channel conditions are received, the filter output value being a function of the received instantaneous channel conditions;

c) calculating an access metric associated with each channel for which indications are received; and d) granting access to the communication system to the group of users associated with the best access metric.

4. The method of claim 3, wherein, for each channel for which indications are received, the access metric is a function of the filter output value and the instantaneous channel condition of the channel.

5. The method of claim 3, wherein the step of computing the filter output value includes adding, for a particular channel, each received indication of the instantaneous channel condition and dividing by the total number of indications.

6. The method of claim 5, wherein the step of calculating the filter output value further includes combining each newly received indication to a current filter output value using a low pass filter function.

7. The method of claim 6, wherein the step of calculating the filter output value further includes selecting a time-constant for the low pass filter.

8. The method of claim 3, wherein the group of users includes only one user.

9. The method of claim 3, wherein only one channel exists between the common transmitting station and any one user.

10. The method of claim 1, wherein the indication of an instantaneous channel condition is an indication of the rate at which the user can receive transmissions from the common transmitting station.

11. The method of claim 3, wherein the indication of an instantaneous channel condition is a data rate control message.

12. The method of claim 7, wherein the filter output value for the $k^{th}$ channel is calculated using the following equation:

$$F_k(t+1)=(1-1/t_c)*F_k(t)+1/t_c*ChC_k$$

wherein $F_k(t)$ is the current filter output value at time t for the $k^{th}$ channel, $t_c$ is the time constant of the low pass filter for the $k^{th}$ channel, and $ChC_k$ is the indication of the instantaneous channel condition for the $k^{th}$ channel.

13. The method of claim 12, wherein if the most recent access metric calculated for the $k^{th}$ channel is not less than the most recent access metric calculated all of the other channels than the filter output value is calculated using the following equation:

$$F_k(t+1)=(1-1/t_c)*F_k(t)+1/t_c*ChC_k$$

wherein $F_k(t)$ is the current filter output value at time t for the $k^{th}$ channel, $t_c$ is the time constant of the low pass filter for the $k^{th}$ channel, and $ChC_k$ is the indication of the instantaneous channel condition for the $k^{th}$ channel, and wherein if the most recent access metric calculated for $k^{th}$ channel is less than at least one recent access metric calculated for another channel than the filter output value is calculated using the following equation:

$$F_k(t+1)=(1-1/t_c)*F_k(t)$$

wherein $F_k(t)$ is the current filter output value at time t for the $k^{th}$ channel, and $t_c$ is the time constant of the low pass filter for the $k^{th}$ channel.

14. The method of claim 12, wherein the filter output value is initialized to a predetermined value.

15. The method of claim 14, wherein the predetermined value is equal to a minimum value for the channel condition divided by the number of users.

16. A method for determining to which users, from among a plurality of users, access to a communication system is to be provided, such access being provided at any one time to a group of users that includes less than all of the plurality of users, such access being provided to the plurality of users over a plurality of channels, each of the plurality of channels being associated with one of the users and providing communication between the associated user and a common transmitting station, the method comprising the steps of:
 a) determining an instantaneous channel condition of at least one of the several channels;
 b) computing an average throughput value for at least some of the channels for which the instantaneous channel conditions are determined;
 c) calculating an access metric associated with each channel for which the instantaneous channel conditions are determined; and
 d) granting access to the communication system to the group of users associated with the best access metric.

17. The method of claim 16, wherein the instantaneous channel condition is determined based upon the carrier-to-interference ratio of the channel.

18. The method of claim 16, wherein the average throughput is determined based upon a data rate at which data was transmitted in previous frames.

19. The method of claim 16, wherein at least some of the users are available bit rate users, and wherein the instantaneous channel conditions are determined for only those available bit rate users in order to determine which of the available bit rate users are to be granted access.

20. A method for granting access to a code division multiple access communication system, including the steps of:
 a) providing access to as many constant bit rate users and variable bit rate users as possible;
 b) determining a channel condition for each channel between a common transmitting station and each of a plurality of available bit rate users attempting to gain access to the communication system;
 c) determining a throughput value associated with each of the channels between the common transmission station and each of the plurality of available bit rate users;
 d) determining an access metric associated with each of the channels between the common transmission station and each of the plurality of available bit rate users; and
 e) if all constant bit rate users and all variable bit rate users have been granted access, then granting access to those available bit rate users associated with the best access metrics.

21. A transmitting station for transmitting to selected users from among a plurality of users, such selected users including less than all of the plurality of users, such transmission being performed to the plurality of users over a plurality of channels, each of the plurality of channels being associated with one of the selected users, including:
 a) a first processor for determining for each channel, a value representing the amount of data transmitted on the channel over a predetermined amount of time;
 b) a receiver that receives a value representing the highest data rate at which each channel can currently receive data;
 c) a second processor that determines for each channel, a ratio of the received value representing the highest data rate, with respect to the value representing the amount of data transmitted and selects at least one user associated with the channels having the highest ratios; and
 d) a transmitter, coupled to the second processor, that transmits over the channels associated with the highest ratios to the selected users.

22. The transmitter of claim 21, wherein the transmitter transmits to only the best user over the channel associated with the highest ratio.

23. A transmitting station for transmitting to selected users from among a plurality of users, such selected users including less than all of the plurality of users, such transmission being performed to the plurality of users over a plurality of channels, each of the plurality of channels being associated with one of the selected users, including:
 a) a first processor that determines a channel condition of a channel associated with each user;
 b) a second processor that calculates the average channel condition of the channels for which channel conditions are determined;
 c) a third processor, coupled to the first and second processors, that, for each user, determines a ratio of the most recently received indication of the channel condition with respect to the average channel condition; and
 d) a transmitter, coupled to the third processor, that transmits over the channel associated with the highest ratio in response to the third processor.

24. A transmitting station for transmitting to selected users from among a plurality of users, such selected users including less than all of the plurality of users, such transmission being performed to the plurality of users over a plurality of channels, each of the plurality of channels being associated with one of the selected users, including:
   a) a first processor that determines an indication of an instantaneous channel condition of at least one of several channels;
   b) a filter, coupled to the first processor, that computes a filter output value for each channel for which the indication of the instantaneous channel conditions are received, the filter output value being a function of the received instantaneous channel conditions; and
   c) a second processor, coupled to the first processor and the filter, that calculates an access metric associated with each channel for which indications are received and selects the group of users associated with the best access metric.

25. The transmitter of claim 24, wherein, for each channel for which indications are received, the access metric is a function of the filter output value and the instantaneous channel condition of the channel.

26. The transmitter of claim 24, wherein the filter adds, for a particular channel, each received indication of the instantaneous channel condition and divides by the total number of indications.

27. The transmitter of claim 26, wherein the filter combines each newly received indication to a current filter output value using a low pass filter function.

28. The transmitter of claim 27, wherein the filter selects a time-constant for the low pass filter.

29. The transmitter of claim 24, wherein the group of users includes only one user.

30. The transmitter of claim 24, wherein only one channel exists between the transmitter and any one user.

31. The transmitter of claim 21, wherein the indication of an instantaneous channel condition is an indication of the rate at which the user can receive transmissions from the common transmitting station.

32. The transmitter of claim 21, wherein the indication of an instantaneous channel condition is a data rate control message.

33. The transmitter of claim 28, wherein the filter calculates an output value for a $k^{th}$ channel using the following equation:

$$F_k(t+1)=(1-1/t_c)*F_k(t)+1/t_c*ChC_k$$

wherein $F_k(t)$ is the current filter output value at time t for the $k^{th}$ channel, $t_c$ is the time constant of the low pass filter for the $k^{th}$ channel, and $ChC_k$ is the indication of the instantaneous channel condition for the $k^{th}$ channel.

34. The transmitter of claim 33, wherein if the most recent access metric calculated for the $k^{th}$ channel is not less than the most recent access metric calculated all of the other channels than the filter output value is calculated using the following equation:

$$F_k(t+1)=(1-1/t_c)*F_k(t)+1/t_c*ChC_k$$

wherein $F_k(t)$ is the current filter output value at time t for the $k^{th}$ channel, $t_c$ is the time constant of the low pass filter for the $k^{th}$ channel, and $ChC_k$ is the indication of the instantaneous channel condition for the $k^{th}$ channel, and wherein if the most recent access metric calculated for $k^{th}$ channel is less than at least one recent access metric calculated for another channel than the filter output value is calculated using the following equation:

$$F_k(t+1)=(1-1/t_c)*F_k(t)$$

wherein $F_k(t)$ is the current filter output value at time t for the $k^{th}$ channel, and $t_c$ is the time constant of the low pass filter for the $k^{th}$ channel.

35. The transmitter of claim 32, wherein the filter is initialized to a predetermined value.

36. The transmitter of claim 34, wherein the predetermined value is equal to a minimum value for the channel condition divided by the number of users.

37. A transmitting station for transmitting to selected users from among a plurality of users, such selected users including less than all of the plurality of users, such transmission being made to the plurality of users over a plurality of channels, each of the plurality of channels being associated with one of the selected users, including:
   a) a first processor that determines an instantaneous channel condition of at least one of the several channels;
   b) a second processor coupled to the first processor, that computes an average throughput value for at least some of the channels for which the instantaneous channel conditions are determined; and
   c) a third processor, coupled to the first and second processor, that calculates an access metric associated with each channel for which the instantaneous channel conditions are determined and grants access to the communication system to the group of users associated with the best access metrics.

38. The transmitter of claim 37, wherein the instantaneous channel condition is determined based upon the carrier-to-interference ratio of the channel.

39. The transmitter of claim 37, wherein the average throughput is determined based upon a data rate at which data was transmitted in at least one previous frame.

40. The transmitter of claim 37, wherein at least some of the users are available bit rate users, and wherein the instantaneous channel conditions are determined for only those available bit rate users in order to determine which of the available bit rate users are to be granted access.

41. A transmitter for transmitting to a code division multiple access communication system, including:
   a) a processor that:
      i) determines a channel condition for each channel between the transmitter and each of a plurality of users attempting to gain access to the transmitter;
      ii) determines a throughput value associated with each of the channels between the common transmission station and each of the plurality of users;
      iii) determines an access metric associated with each of the channels between the common transmission station and each of the plurality of users; and
      iv) grants access to those users associated with the best access metrics.

42. The transmitter of claim 41, further including:
   a) a receiver, coupled to the processor, that receives an indication as to whether data transmitted to user has been successfully received by the user;
wherein the processor is coupled to the receiver and adjusts the throughput value associated with a user to which data was sent but not received in response to the receiver receiving the indication.

43. The transmitter of claim 39, wherein the processor selects all constant bit rate (CBR) users and all variable bit rate (CBR) users before selecting any available bit rate (ABR) users.

44. The transmitter of claim 41, wherein access metrics are only calculated for ABR users.

45. A method for transmitting from a transmitting station to a receiver in a code division multiple access communication system, including:
   a) transmitting to as many constant bit rate users and variable bit rate users as can be supported;
   b) determining a channel condition for each channel between the transmitter and each of a plurality of available bit rate users attempting to gain access to the transmitter;
   c) determining a throughput value associated with each of the channels between the common transmission station and each of the plurality of available bit rate users;
   d) determining an access metric associated with each of the channels between the common transmission station and each of the plurality of available bit rate users; and
   e) if all constant bit rate users and all variable bit rate users have been granted access, then granting access to those available bit rate users associated with the best access metrics.

46. The method of claim 45, further including:
   a) receiving an indication as to whether data transmitted to user has been successfully received by the user;
   b) adjusting the throughput value associated with a user to which data was sent, but not received, in response to the receiver receiving the indication.

* * * * *